US008881045B2

(12) United States Patent
Yang et al.

(10) Patent No.: US 8,881,045 B2
(45) Date of Patent: Nov. 4, 2014

(54) METHOD AND APPARATUS FOR GENERATING PROMPT INFORMATION OF A MOBILE TERMINAL

(75) Inventors: Jian Yang, Shenzhen (CN); Guoqiao Chen, Shenzhen (CN); Lei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 557 days.

(21) Appl. No.: 12/562,864

(22) Filed: Sep. 18, 2009

(65) Prior Publication Data

US 2010/0011293 A1    Jan. 14, 2010

Related U.S. Application Data

(63) Continuation-in-part of application No. PCT/CN2008/071669, filed on Jul. 17, 2008.

(30) Foreign Application Priority Data

Jul. 17, 2007  (CN) .......................... 2007 1 0119151

(51) Int. Cl.
| | |
|---|---|
| *G06F 3/00* | (2006.01) |
| *G11B 27/34* | (2006.01) |
| *G11B 27/034* | (2006.01) |
| *G11B 27/10* | (2006.01) |
| *G11B 27/30* | (2006.01) |
| *G11B 27/32* | (2006.01) |
| *H04M 19/04* | (2006.01) |
| *H04M 1/725* | (2006.01) |

(52) U.S. Cl.
CPC .............. *G11B 27/34* (2013.01); *G11B 27/034* (2013.01); *G11B 27/105* (2013.01); *G11B 27/3027* (2013.01); *G11B 27/322* (2013.01); *H04M 19/04* (2013.01); *H04M 1/72558* (2013.01)
USPC ................. 715/772; 379/373.01; 379/373.02; 379/374.03; 379/376.01; 455/567; 715/716

(58) Field of Classification Search
CPC .......... G06F 3/16; H04W 4/12; H04M 19/04; H04N 5/44543
USPC ............... 715/716, 727, 772; 455/412.2, 413, 455/567; 379/373.01, 373.02, 374.01, 379/376.01
See application file for complete search history.

(56) References Cited

U.S. PATENT DOCUMENTS 5,481,542 A  *  1/1996  Logston et al. ............... 725/131
5,760,767 A       6/1998  Shore et al.

(Continued)

FOREIGN PATENT DOCUMENTS

| CN | 1319813 A | 10/2001 |
|---|---|---|
| CN | 1514997 A | 7/2004 |

(Continued)

OTHER PUBLICATIONS

First office action of corresponding Chinese Patent Application No. 200710119151.9, mailed Nov. 27, 2009, and English translation thereof, 12 pages total.

(Continued)

*Primary Examiner* — Tadeese Hailu
(74) *Attorney, Agent, or Firm* — Conley Rose, P.C.; Grant Rodolph; Nicholas K. Beaulieu (57) ABSTRACT

A method and apparatus for generating prompt information of a mobile terminal are disclosed. The method includes: selecting a start point and an end point in a multimedia file; clipping a part of the multimedia file between the start point and the end point in the multimedia fil e; and encoding the clipped part of the multimedia file, and generating prompt information of the mobile terminal. An apparatuses for generating prompt information of a mobile terminal is also disclosed. Therefore, the present invention enables a user to control the generation of prompt information of a mobile terminal.

16 Claims, 7 Drawing Sheets

(56) References Cited

U.S. PATENT DOCUMENTS

| | | | |
|---|---|---|---|
| 5,919,047 A * | 7/1999 | Sone | 434/307 A |
| 7,369,880 B2 * | 5/2008 | Ikeda et al. | 455/567 |
| 7,747,290 B1 * | 6/2010 | Lundy et al. | 455/567 |
| 2002/0018556 A1 | 2/2002 | Okazaki | |
| 2003/0008687 A1 * | 1/2003 | Nishimura | 455/567 |
| 2004/0226048 A1 * | 11/2004 | Alpert et al. | 725/109 |
| 2004/0266399 A1 * | 12/2004 | Simpson | 455/412.1 |
| 2005/0070241 A1 | 3/2005 | Northcutt | |
| 2005/0170865 A1 | 8/2005 | Harvej | |
| 2005/0185918 A1 * | 8/2005 | Lowe | 386/46 |
| 2006/0028951 A1 * | 2/2006 | Tozun et al. | 369/84 |
| 2006/0079295 A1 * | 4/2006 | Chan | 455/567 |
| 2006/0235883 A1 * | 10/2006 | Krebs | 707/104.1 |
| 2006/0293089 A1 * | 12/2006 | Herberger et al. | 455/567 |
| 2007/0036300 A1 * | 2/2007 | Brown et al. | 379/88.22 |
| 2007/0112977 A1 * | 5/2007 | Hornal et al. | 709/246 |
| 2007/0121860 A1 * | 5/2007 | Liang et al. | 379/158 |
| 2008/0034220 A1 * | 2/2008 | Abu-Amara et al. | 713/189 |
| 2008/0167968 A1 * | 7/2008 | Cue et al. | 705/26 |
| 2008/0188268 A1 * | 8/2008 | Kim et al. | 455/566 |
| 2008/0207180 A1 * | 8/2008 | Peters | 455/414.1 |
| 2008/0207263 A1 * | 8/2008 | May et al. | 455/556.2 |
| 2008/0263046 A1 * | 10/2008 | Kristensson et al. | 707/9 |
| 2008/0280641 A1 * | 11/2008 | Kristensson et al. | 455/556.1 |
| 2008/0320415 A1 * | 12/2008 | Ostergaard | 715/810 |
| 2009/0164942 A1 * | 6/2009 | Laaksonen et al. | 715/810 |
| 2010/0178211 A1 * | 7/2010 | Ushijima | 422/106 |

FOREIGN PATENT DOCUMENTS

| | | | |
|---|---|---|---|
| CN | 1697458 A | 11/2005 | |
| CN | 1791126 A | 6/2006 | |
| CN | 1878217 A | 12/2006 | |
| CN | 101094469 A | 12/2007 | |
| EP | 1775925 A2 | 4/2007 | |
| KR | 20020059031 A | 7/2002 | |
| WO | 2006031809 A2 | 3/2006 | |
| WO | 2006090211 A2 | 8/2006 | |
| WO | 2006129148 A1 | 12/2006 | |

OTHER PUBLICATIONS

Second office action of corresponding Chinese Patent Application No. 200710119151.9, mailed Nov. 12, 2010, and English translation thereof, 10 pages total.

Predrag Supurovic : "MPEG audio frame header", retrieved from the Internet: <http://www.mpgedit.org/mpgedit/mpeg_format/mpeghdr.htm>, dated Dec. 22,1999, 8 pages total.

Search report of corresponding European patent application No. EP08773204.6, mailed May 10, 2010, 9 pages total.

Written Opinion issued in corresponding PCT Patent Application No. PCT/CN2008/071669, mailed Oct. 30, 2008, 4 pages total.

Rejection Decision of corresponding Chinese Patent Application No. 200710119151.9, mailed Jul. 25, 2011,and English translation thereof,12 pages total.

Foreign Communication From a Counterpart Application, Chinese Application 201110352567.1, Chinese Office Action dated Feb. 21, 2013, 10 pages.

Foreign Communication From a Counterpart Application, Chinese Application 201110352567.1, Partial Translation of Chinese Office Action dated Feb. 21, 2013, 13 pages.

Foreign Communication From a Counterpart Application, European Application No. 08773204.6, European Office Action dated Jul. 25, 2013, 6 pages.

* cited by examiner

METHOD AND APPARATUS FOR GENERATING PROMPT INFORMATION OF A MOBILE TERMINAL

CROSS-REFERENCE TO RELATED APPLICATIONS

The present application is a continuation in part of International Application No. PCT/CN2008/071669, filed on Jul. 17, 2008, which claims priority to Chinese patent application No. 200710119151.9, entitled "Method and Apparatus for Generating Prompt Information of a Mobile Terminal", and filed with the China Patent Office on Jul. 17, 2007, the entire contents of which are incorporated herein by reference.

FIELD OF THE INVENTION

The embodiments of the present invention relate to the field of mobile communications, and in particular, to a method and apparatus for generating prompt information of a mobile terminal.

BACKGROUND OF THE INVENTION

Mobile terminals are prevalent communication tools nowadays. When receiving calls or information, a mobile terminal may give a user a prompt, such as an audio ring tone prompt, a video prompt, a vibration prompt, and other prompts, for example, light twinkle.

In earlier phases, the ring tone of the mobile terminal is simple. With the development of technologies, the ring tone prompt of the mobile terminal develops from the earlier single ring tone to present 72 polyphonic ringers. Furthermore, music ring tones in MPEG-1 audio layer 3 (MP3) format and human voice ring tones are available.

Currently, the mobile terminal supports ring tones in the following formats: memory mapped files (MMF), musical instrument digital interface (MIDI), windows audio volume (WAV), adaptive multi-rate (AMR), MP3, iMelody ring tone format (IMY), ring tone transfer language (RTTL), and advanced audio coding (AAC). The MMF and MIDI formats are most used ones in the mobile terminal. The previous single ring tone of the mobile phone uses the IMY and RTTL formats.

For the generation of audio ring tone prompt information, two methods are available in the prior art.

One method is to customize a ring tone. This is a typical scheme for making a ring tone based on a mobile terminal or PC. The main idea of this method is to provide a piece of music to the user in terms of notes. That is, the user edits the ring tone of the mobile terminal according to the music represented by the defined notes. By entering such notes as "1", "2", "3", "4", "5", "6", and "7", the user can compose a piece of music according to his/her own interests and music ability. After composing the music, the software generates a ring tone and audio ring tone prompt information according to the music scores entered by the user. This method requires the user to have a certain music ability to customize a ring tone. In addition, the whole process is complex because the notes are entered through the mobile terminal or PC. Furthermore, the ring tone is simple due to limitation of music knowledge of the user.

The other method is to use an existing audio file as ring tone prompt information. For example, the audio file in such formats as MIDI, MP3, and OGG can be used as ring tone prompt information. A complete audio file lasts about three minutes, but a normal calling process lasts less than one minute. Thus, it is improper to use the audio file as the ring tone.

During the implementation of the present invention, the inventor discovers at least the following problems in the prior art:

In the method for generating prompt information of a mobile terminal in the prior art, the process of generating prompt information is complex, or the length is beyond control, and multiple pieces of prompt information cannot be generated at the same time.

SUMMARY OF THE INVENTION

Embodiments of the present invention provide a method and apparatus for generating prompt information of a mobile terminal, so that a user can control the generation of prompt information of the mobile terminal.

A method for generating prompt information of a mobile terminal includes:
 selecting a start point and an end point in a multimedia file;
 clipping a part of the multimedia file between the start point and the end point in the multimedia file; and
 encoding the clipped part of the multimedia file, and generating prompt information of the mobile terminal.

Another method for generating prompt information of a mobile terminal includes:
 selecting a start point and an end point in a multimedia file; and
 setting the start point in multimedia information as a start point of prompt information of the mobile terminal, where the start point is used as a play start ID; and setting the end point in multimedia information as an end point of prompt information of the mobile terminal, where the end point is used as a play end ID.

Another method for generating prompt information of a mobile terminal includes:
 selecting a start point and an end point in multiple multimedia files;
 clipping and associating parts between the start point and the end point in the multiple multimedia files, where the parts of the multimedia files are decoded and played in sequence, and generating an association file; and
 recording a play sequence, and the start point and end point of the multimedia files in the association file, and generating prompt information of the mobile terminal.

An apparatus for generating prompt information of a mobile terminal includes:
 a selecting module, adapted to select a start point and an end point in a multimedia file;
 a clipping module, adapted to clip a part of the multimedia file between the start point and the end point in the multimedia file; and
 a generating module, adapted to encode the clipped part of the multimedia file, and generate prompt information of the mobile terminal.

Another apparatus for generating prompt information of a mobile terminal includes:
 a selecting module, adapted to select a start point and an end point in a multimedia file; and
 a setting module, adapted to set the start point in multimedia information as a start point of prompt information of the mobile terminal, where the start point is used as a play start ID; and set the end point in multimedia information as an end point of prompt information of the mobile terminal, where the end point is used as a play end ID.

Another apparatus for generating prompt information of a mobile terminal includes:

a selecting module, adapted to select a start point and an end point in multiple multimedia files;

a clipping module, adapted to clip parts between the start point and the end point in the multiple multimedia files, where the parts of the multimedia files are encoded and played in sequence;

an association file generating module, adapted to associate the parts of the multimedia files clipped by the clipping module, and generate an association file; and a prompt information generating module, adapted to record a play sequence, and the start point and end point of the multimedia files in the association file, and generate prompt information of the mobile terminal.

Compared with the prior art, embodiments of the present invention have the following merits:

(1) Embodiments of the present invention clip the part between the start point and end point in one or more multimedia files, encode the clipped part, and generate prompt information of a mobile terminal. Besides, embodiments of the present invention generate new prompt information suitable for a ring tone of the terminal by encoding and combining multimedia file contents that are not suitable for the terminal. Thus, embodiments of the present invention are simple and easy to implement. (2) Embodiments of the present invention select the start point and end point in one or more multimedia files, set the start point and the end point in multimedia information as a start point and an end point of prompt information of a mobile terminal, and use a favorable part of the multimedia files as the prompt information of the mobile terminal. Thus, the user may freely select any part of the multimedia files as the prompt information, and control the play length of the prompt information in real time. (3) Embodiments of the present invention clip and associate parts between the start point and end point in multiple multimedia files, where the clipped parts are played in serial or parallel mode, and generate prompt information of a mobile terminal. Thus, the audio prompt, vibration prompt and light twinkle prompt are integrated, and the user experience is improved.

DETAILED DESCRIPTION OF THE EMBODIMENTS

The technical solution of embodiments of the present invention is hereinafter described in detail with reference to accompanying drawings and embodiments.

With the method provided in an embodiment of the present invention, prompt information of a mobile terminal may be generated freely; besides audio prompt information, multiple types of prompt information may be generated, such as video, animation, flash, vibration, and light twinkle. Any or a combination of the preceding types of prompt information may be generated by using a customized method.

The vibration prompt of the mobile terminal may be implemented by an eccentric motor configured in the mobile terminal. The rotation rate and rotation mode of the eccentric motor are under the control of mobile terminal software, through which the vibration start/end time, vibration strength, and vibration mode may be controlled. For example, the following three vibration modes are available in a mobile terminal.

The first is stable vibration. In this mode, the eccentric motor in the mobile terminal always vibrates at a same rate so that the user feels stable vibration.

The second is accelerating vibration. In this mode, the eccentric motor in the mobile terminal accelerates the rotation continuously, so that the user feels accelerated vibration.

The third is shift vibration. In this mode, the eccentric motor of the mobile terminal changes its rotation rate frequently so that the user feels variable vibration.

In practical applications, other types of vibration may also be available.

A signal lamp is configured in most of mobile terminals. The signal lamp may emit colorful light to provide a light twinkle prompt, which is used to describe the signal strength or status of a mobile terminal. The light twinkle of a mobile terminal is subject to the control of the mobile terminal software. The controllable information and parameters include color, twinkle duration, and twinkle frequency. For example, the following three light twinkle modes are available in a mobile terminal.

The first is interval twinkle. In this mode, the twinkle is always generated at a same frequency. If there are lights in multiple colors, these lights may twinkle alternatively, but at a same frequency.

The second is accelerating twinkle. In this mode, the twinkle frequency is increasing continuously. The user may feel that the light twinkles more and more quickly. If there are lights in multiple colors, these lights may twinkle alternatively, but the twinkle frequency is based on the accelerating twinkle mode.

The third is disorder twinkle. In this mode, the twinkle frequency is variable. The twinkle frequency may be random or changes according to a rule. The user may feel that the twinkle is disorderly, and may not be sure when the twinkle occurs. If there are lights in multiple colors, these lights may twinkle alternatively, but the twinkle frequency is based on the disorder twinkle mode.

In practical applications, other types of light twinkles may also be available.

Figure 1:
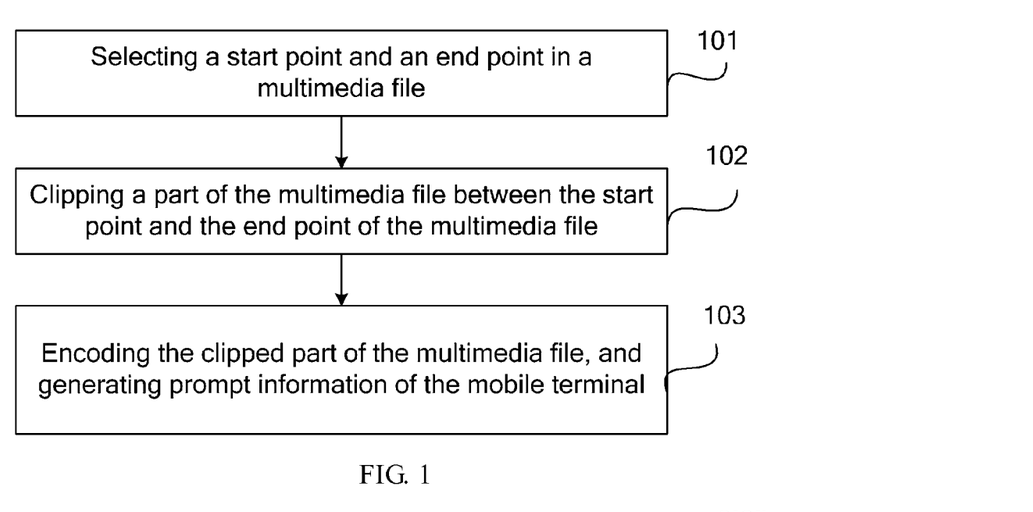
FIG. 1 is a flowchart of a method for generating prompt information of a mobile terminal according to an embodiment of the present invention.

FIG. 1 is a flowchart of a method for generating prompt information of a mobile terminal according to an embodiment of the present invention. The method includes the following steps:

Step 101: Selecting a start point and an end point in a multimedia file.

Step 102: Clipping a part of the multimedia file between the start point and the end point in the multimedia file.

Step 103: Encoding the clipped part of the multimedia file into prompt information of the mobile terminal.

Thus, to generate a piece of new prompt information suitable for the mobile terminal based on the old multimedia file, this embodiment of the present invention needs to encode and combine the old multimedia file contents that are not suitable for the mobile terminal. In general, many types of multimedia files may be available, such as video, audio, and animation files. For simple description, this embodiment of the present invention is described on the basis of an audio ring tone file, for example, an MP3 file.

Figure 2:
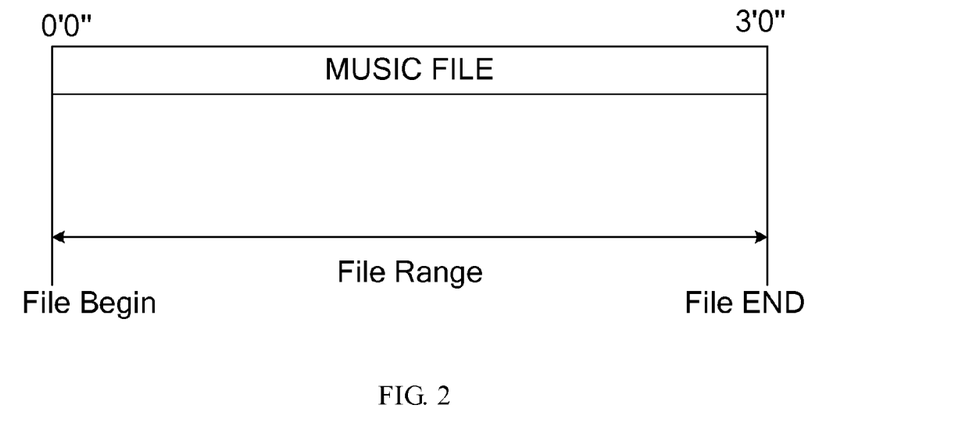
FIG. 2 shows an audio file in MP3 format in a method for generating prompt information of a mobile terminal according to an embodiment of the present invention.

To generate audio prompt information in MP3 format, an audio file in MP3 format needs to be obtained. FIG. 2 shows an audio file in MP3 format in a method for generating prompt information of a mobile terminal according to an embodiment of the present invention. The whole MP3 ring tone file lasts three minutes. When the MP3 file is used as audio prompt information, the MP3 file is played from the beginning; that is, it is played from zero seconds. The play of the MP3 file continues until the terminal completes the call setup because the normal calling process lasts less than one minute.

To achieve a better ring tone effect, the user needs to clip one of more audio segments according to preferences of the user, and combine these clipped audio segments to generate audio prompt information.

Figure 3:
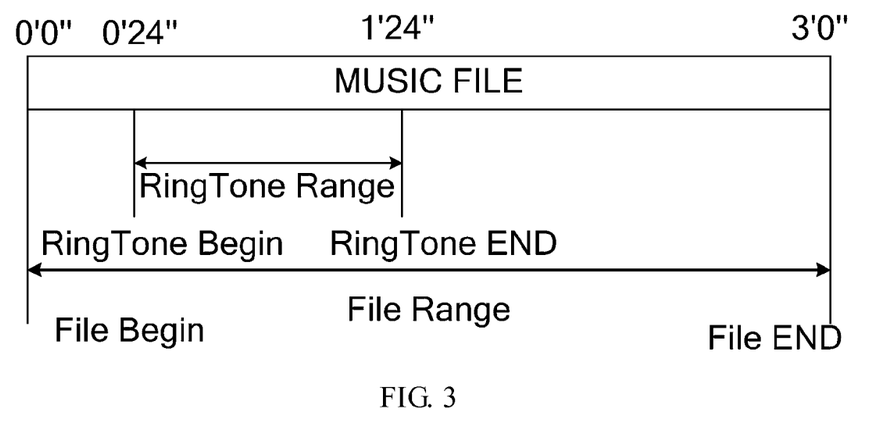
FIG. 3 shows a clipped part of an audio file in MP3 format in a method for generating prompt information of a mobile terminal according to an embodiment of the present invention.

FIG. 3 shows a clipped part of an audio file in MP3 format in a method for generating prompt information of a mobile terminal according to an embodiment of the present invention. In this embodiment of the present invention, contents at 0'24" and 1'24" of the audio file are selected as the start point and end point of audio prompt information. The audio file content between 0'24" and 1'24" is re-encoded to generate a piece of new audio prompt information in MP3 or other formats. The new audio prompt information may be a favorable ring tone of the user.

Figure 4:
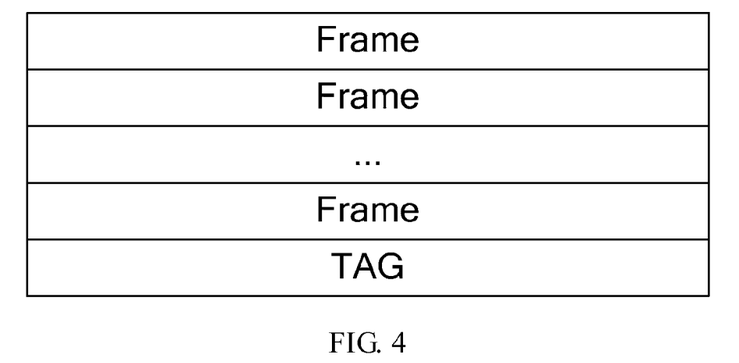
FIG. 4 shows a structure of an MP3 file.

MP3 is a general ring tone format at present. FIG. 4 shows a structure of an MP3 file. An MP3 audio file is divided into multiple frames, each of which is independent and has its own header and audio information. Because the MP3 audio file does not have a header, any segment of the MP3 audio file may be clipped and played normally. The information about the MP3 audio file may be obtained from the first frame by reading the header of the first frame, and other frames are supposed to have the same information. A tag is used to describe an MP3 audio file.

Figure 5:
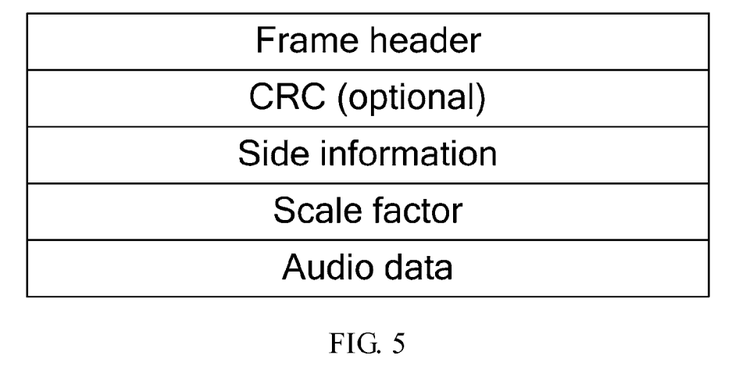
FIG. 5 shows an MP3 frame structure.

FIG. 5 shows an MP3 frame structure. In a frame, the header is formed by the first four bytes (32 bits) of the frame. The first 11 bits of the header are always set to "1", which are called frame alignment. Thus, the whole file may be searched to identify a first location where consecutive 11 bits are set to "1"; the whole header may be read; and the header value may be checked. The following table defines each bit of the header so that each value can be checked. If the validity is set to "Reserved", "Invalid", "Broken", or "Disabled", the header is invalid.

A frame may require a cyclical redundancy check (CRC). If the CRC is required, the CRC is 16 bits long, and is located after the frame header. When another frame header needs to be read or CRC calculation of this frame is needed for comparison only, the frame length may be calculated and used. This is a good method for checking the validity of the header of the MP3 file. The CRC is followed by side information. Scale factor information is located after the side information, and followed by audio data.

Figure 6:
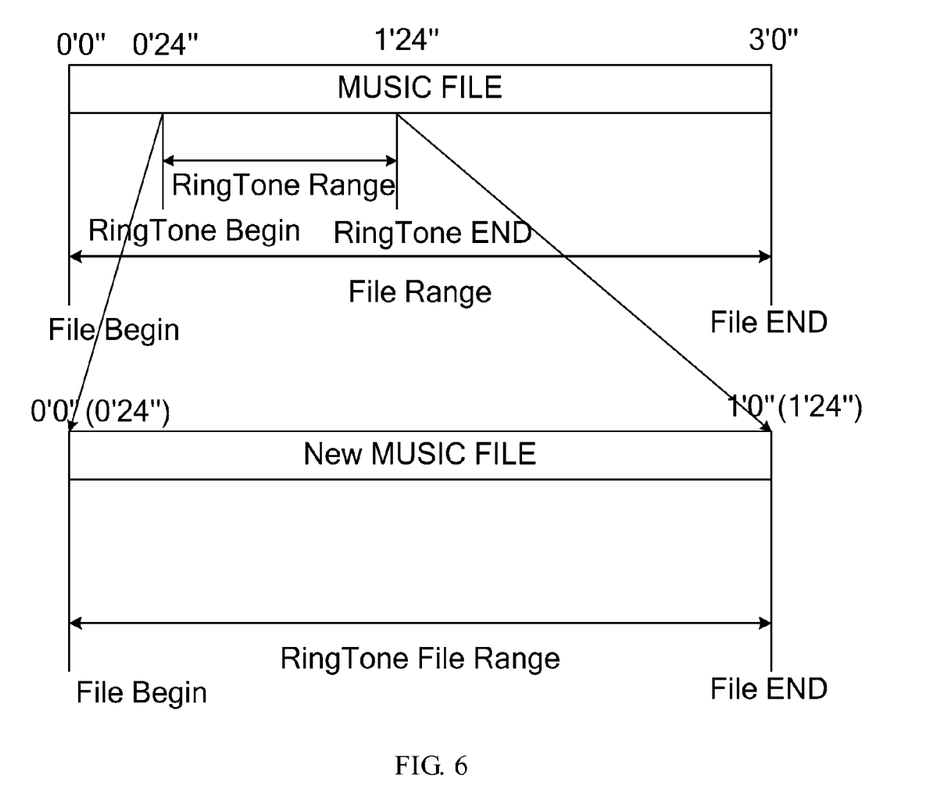
FIG. 6 shows a process of generating audio prompt information by using a clipped part of an audio file in MP3 format in a method for generating prompt information of a mobile terminal according to an embodiment of the present invention.

An MP3 audio file includes multiple frames, each of which is independent and has its own header and audio information, but the MP3 audio file does not have a header. Thus, the MP3 file may be clipped by frame, and played properly. The part from a frame represented by 0'24" to a frame represented by 1'24" in an MP3 audio file may be clipped, and the clipped frames may be combined into a piece of new audio prompt information. FIG. 6 shows a process of generating audio prompt information by using a clipped part of an MP3 audio file in a method for generating prompt information of a mobile terminal according to an embodiment of the present invention.

To play the audio prompt information properly, it is necessary to modify the first frame of the audio prompt information, that is, the header of the frame represented by 0'24" of the old file. In this frame header, the first 11 bits among the first four bytes should be set to "1", and used as an alignment frame. When a player plays the audio prompt information, the player can search the whole file, and determine a first location where consecutive 11 bits are set to "1".

In addition, in the last tag area of the MP3 file, the description of the audio prompt information may be modified. The description information includes artist, title, album, year, music style, and related comments.

Through the preceding process, the user may clip a part of audio contents from an audio file, and generate audio prompt information suitable for a mobile terminal.

The preceding embodiment clips a part of an independent file to generate a piece of new audio prompt information. The present invention is not limited to this mode, and may include one of the following:

clipping one or more files in a file, and combining the clipped files into a file; or clipping one or more files in multiple files, and combining the clipped files into a file.

Generally, the generated prompt information may be multiple ring tone elements. The prompt information may be video, audio, animation, and flash elements. For different elements, different prompt information may be generated according to the preceding method, and a piece of unified prompt information of a mobile terminal may be generated according to a rule.

An apparatus for generating prompt information of a mobile terminal in the first embodiment of the present invention includes: a selecting module, adapted to select a start point and an end point in a multimedia file; a clipping module, adapted to clip a part of the multimedia file between the start point and the end point; and a generating module, adapted to encode the clipped part of the multimedia file, and generate prompt information of the mobile terminal.

In the preceding embodiment, a piece of audio prompt information is generated by using the content clipped in an audio file by the user. The audio prompt information may also be generated on the basis of the old file. That is, a start point and an end point for the prompt information of a mobile terminal are set in a multimedia file, and are used as the play start ID and play end ID.

Figure 7:
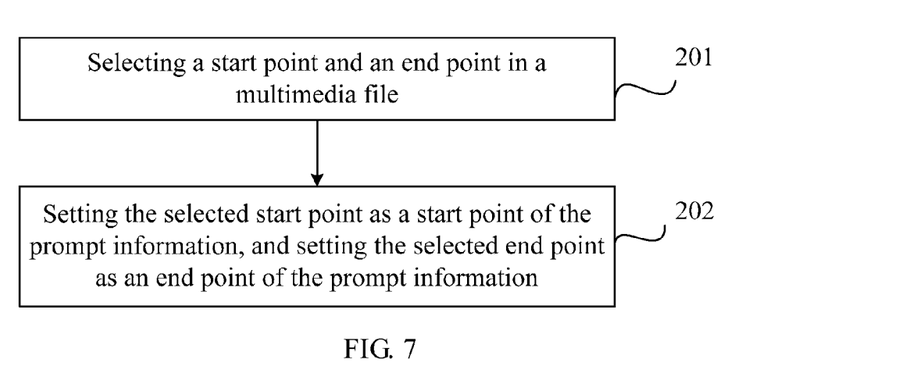
FIG. 7 is a flowchart of a method for generating prompt information of a mobile terminal according to an embodiment of the present invention.

FIG. 7 is a flowchart of a method for generating prompt information of a mobile terminal according to an embodiment of the present invention. The method includes the following steps:

Step 201: Selecting a start point and an end point in a multimedia file.

Step 202: Setting the start point in the multimedia information as a start point of prompt information of the mobile terminal, where the start point is used as the play start ID, and setting the end point in the multimedia information as the end point of prompt information of the mobile terminal, where the end point is used as the play end ID.

Taking an MP3 audio file as an example, the contents from 0'24" and 1'24" are selected as the contents of audio prompt information. The following information is written into the header of the MP3 file:

Purpose: ring tone.
Start point of the ring tone file.
End point of the ring tone file.

Figure 8:
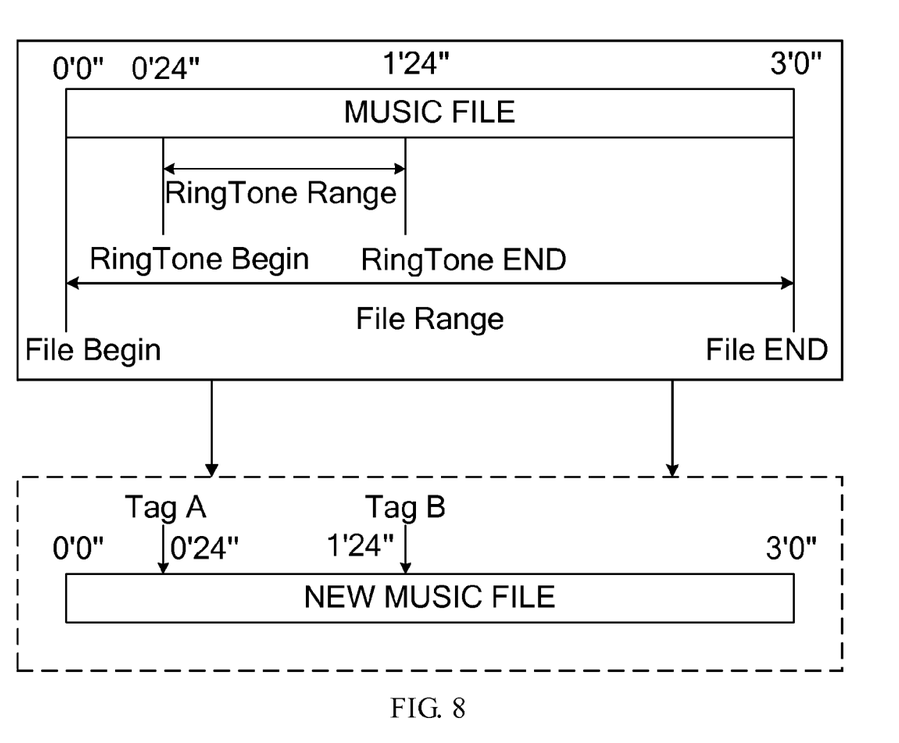
FIG. 8 shows a process of generating prompt information of a mobile terminal according to an embodiment of the present invention.

FIG. 8 shows a process of generating prompt information of a mobile terminal according to an embodiment of the present invention. As shown in FIG. 8, the new music file may be same as or different from the old music file. In the new music file, two tags are added. One tag indicates the start point of audio prompt information, and the other tag indicates the end point of audio prompt information. The information is written into the header field. When the audio prompt information is played, these tags are identified, and the prompt information from the start point to the end point of the audio prompt information is played.

The purpose, start point, and end point of the audio prompt information are described in the description/header field information of the audio prompt information. The following gives a simple description of an MP3 file.

Table 1 shows the information distribution in an MP3 file, and especially the tag of the MP3 file.

TABLE 1

| Length (Bytes) | Location (Bytes) | Description |
| --- | --- | --- |
| 3 | (0-2) | Tag ID, mandatory if a tag exists and is correct |
| 30 | (3-32) | Title |
| 30 | (33-62) | Artist |
| 30 | (63-92) | Album |
| 4 | (93-96) | Year |
| 30 | (97-126) | Comment |
| 1 | (127) | Genre |

According to the preceding information and considering actual requirements, the purpose, start point, and end point of the file are written into the file. The comment content may also be used. For example, the following information may be written into the comment:

FOR RINGTONE; 0'24; 1'24';

The information indicates that the file is used as prompt information. When the player parses this segment of data, the player jumps to 0'24" and plays the file until 1'24". If the file needs to be played continuously, the player may replay the file starting from 0'24".

Because the tag information should be located at the end of the MP3 file, the player needs to parse the tag information of the MP3 file before playing the MP3 file, and implements the prompt function.

Generally, the generated prompt information may be multiple ring tone elements. The prompt information may be video, audio, animation, and flash elements. For different elements, the method for generating prompt information may be used to describe the purpose of an element file in the header of other parts of the file, and identify the part between a start point and an end point as the prompt information.

An apparatus for generating prompt information of a mobile terminal according to the second embodiment of the present invention includes: a selecting module, adapted to select a start point and an end point in a multimedia file; and a setting module, adapted to set the start point in the multimedia information as the start point of prompt information of the mobile terminal, where the start point is used as a play start ID, and set the end point in the multimedia information as the end point of prompt information of the mobile terminal, where the end point is used as a play end ID.

Figure 9:
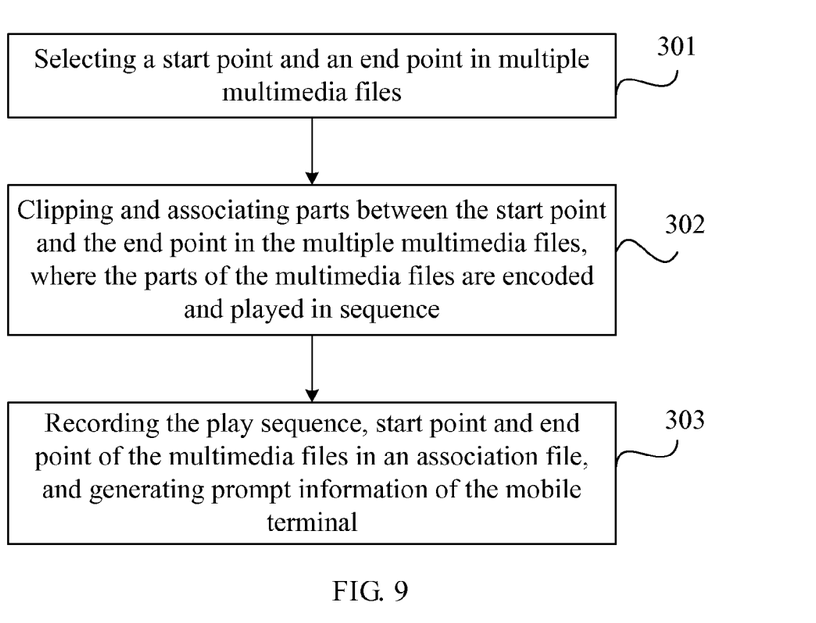
FIG. 9 is a flowchart of a method for generating prompt information of a mobile terminal according to an embodiment of the present invention.

FIG. 9 is a flowchart of a method for generating prompt information of a mobile terminal according to an embodiment of the present invention. This embodiment clips and associates parts of multiple multimedia files, where the parts of the multimedia files are decoded and played in sequence, and generates prompt information of a mobile terminal. The method includes the following steps:

Step 301: Selecting a start point and an end point in multiple multimedia files.

Step 302: Clipping and associating parts between the start point and the end point of the multiple multimedia files, where the parts of the multiple multimedia files are encoded and played in sequence.

Step 303: Recording the play sequence, start point and end point of the multimedia files in an association file, and generating prompt information of the mobile terminal.

That is, one or more segments of the multimedia files are clipped as the prompt information of the mobile terminal. The principle is as follows: The old multimedia files are associated with a file, and only the file needs to be read during the subsequent play.

Figure 10:
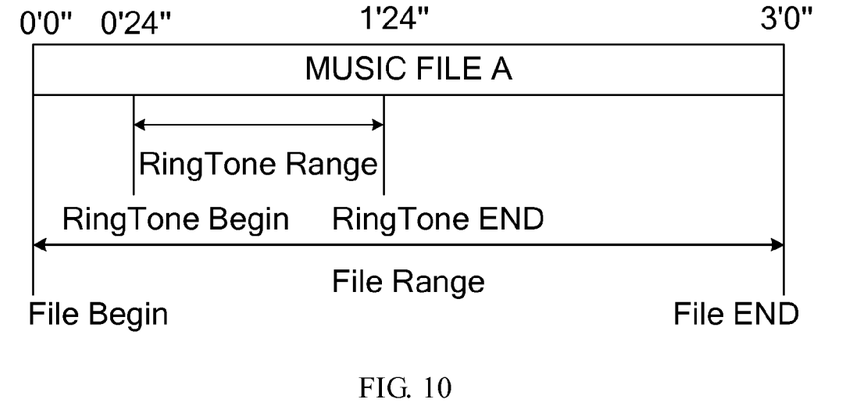
FIG. 10 shows a time distribution of file A in a method for generating prompt information of a mobile terminal according to an embodiment of the present invention.
Figure 11:
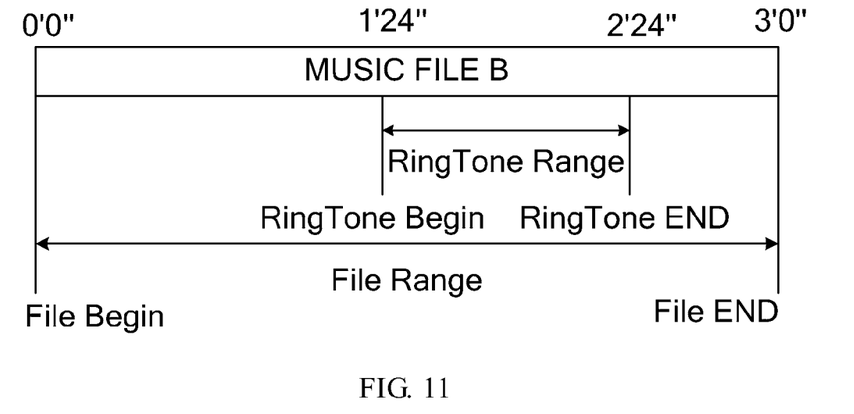
FIG. 11 shows a time distribution of file B in a method for generating prompt information of a mobile terminal according to an embodiment of the present invention.
Figure 12:
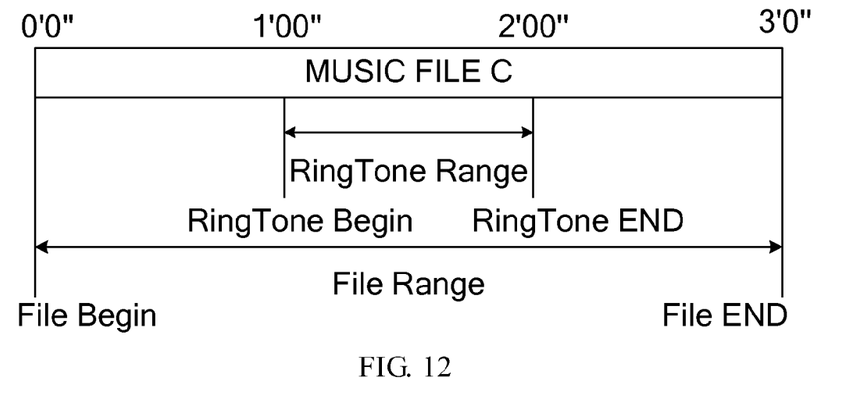
FIG. 12 shows a time distribution of file C in a method for generating prompt information of a mobile terminal according to an embodiment of the present invention.

As shown in FIG. 10 to FIG. 12, there are File A, File B, and File C (the case is similar when there is only one file). FIG. 10 to FIG. 12 show time distribution of three files in a method for generating prompt information of a mobile terminal according to an embodiment of the present invention. In File A, the part between 0'24" and 1'24" is selected; in File B, the part between 1'24" and 2'24" is selected; and in File C, the part between 1'00" and 2'00" is selected. When audio prompt information is played, the part between 0'24" and 1'24" in File A is played first, followed by the part between 1'24" and 2'24" in File B and the part between 1'00" and 2'00" in File C. If the player continues playing the files, the player may replay the preceding contents.

A Profile file is generated. The Profile file may be in different formats, and records the play sequence and start/end point of a ring tone file. In this embodiment, the Profile file is named *.Ringtone.

Figure 13:
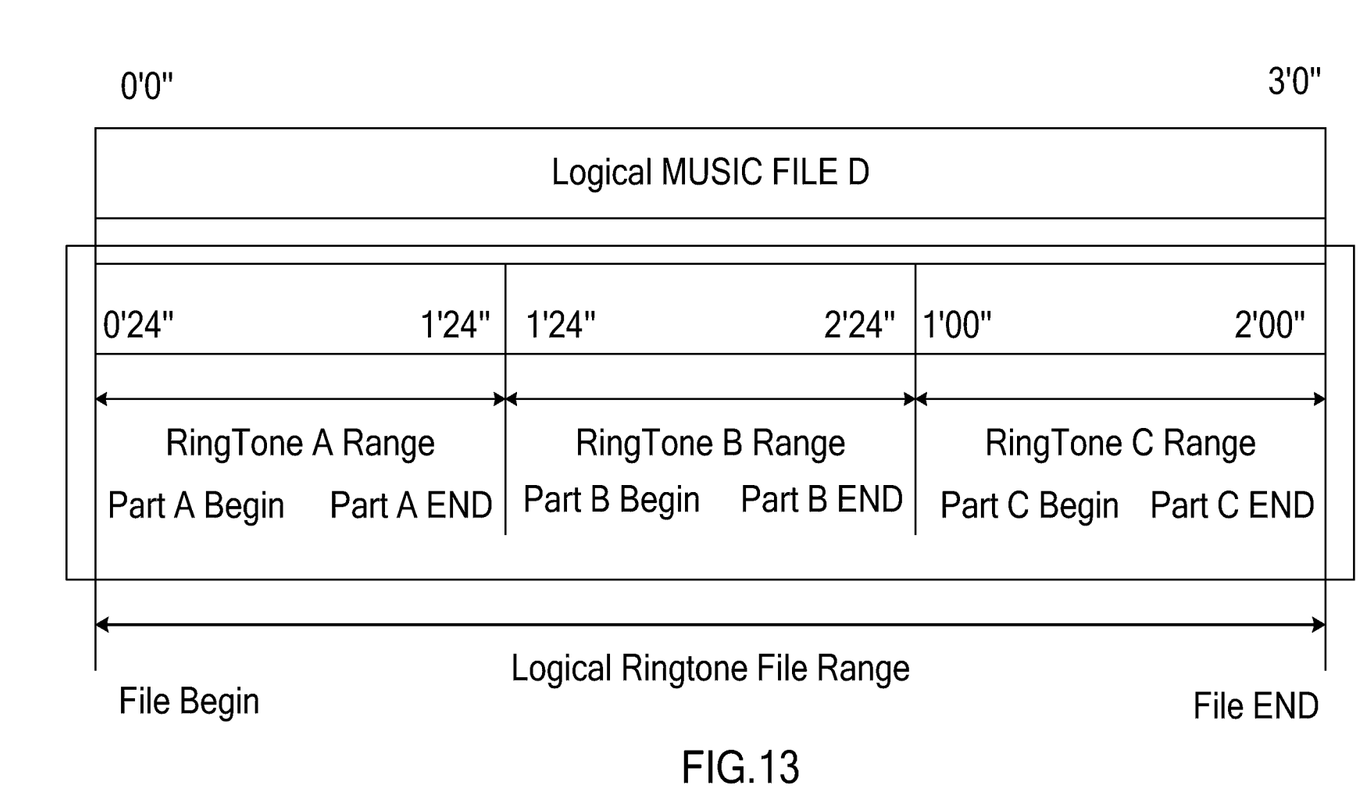
FIG. 13 shows a piece of audio prompt information in a method for generating prompt information of a mobile terminal according to an embodiment of the present invention.

FIG. 13 shows a piece of audio prompt information in a method for generating prompt information of a mobile terminal according to an embodiment of the present invention. The whole audio prompt information may be called a complete audio file that is synthesized logically. The ring tone player of the mobile terminal may play this audio file completely.

This embodiment defines the name of the association file as MyRing.Ringtone. The association file includes the following ring tone related information:

File name: FileName.

File location (relative location, and absolute location may also be used):

FileLocation.

Start time of playing a ring tone: StartTime.

End time of playing a ring tone: EndTime.

Number of replaying times: RepeatTime.

A new file is formed according to the preceding information in this embodiment. The new file may be in text format or other formats. As shown in Table 2, this embodiment is described supposing the file is in text format.

TABLE 2

```
---Start---
AUDIO: MUSIC FILE A.mp3;
    RingTone/MUSIC FILE A.mp3;
    Start Time: 0'24";
    End Time: 1'24";
    Repeat Time: 1;
AUDIO: MUSIC FILE B.mp3;
    RingTone/MUSIC FILE B.mp3;
    Start Time: 1'24";
    End Time: 2'24";
    Repeat Time: 1;
AUDIO: MUSIC FILE B.mp3;
    RingTone/MUSIC FILE B.mp3;
    Start Time: 1'00";
    End Time: 2'00";
    Repeat Time: 1;
---END---
```

The player reads the name of the audio file first. Then, the player reads the file location, and reads the file into the player at the file location. The player jumps to a specified start time point in the file, and plays the file until a specified end time point in the file. When there is a need to replay the file, the player may use the data in the RepeatTime to decide whether to replay the file and how many times the file is replayed. Then, the player continues searching for the play sequence and time information of the file until the player meets an end symbol.

An apparatus for generating prompt information of a mobile terminal in the third embodiment of the present invention includes: a selecting module, adapted to select a start point and an end point in multiple multimedia files; a clipping module, adapted to clip parts between the start point and the end point in the multiple multimedia files, where the parts of the multimedia files are encoded and played in sequence; an association file generating module, adapted to associate the parts of the multimedia files clipped by the clipping module, and generate an association file; and a prompt information generating module, adapted to record the play sequence, start point and end point of the multimedia files in the association file, and generate prompt information of the mobile terminal.

This embodiment does not need to perform new encoding, and does not need to modify fields or contents. This embodiment generates prompt information by using an external association file, thus improving the flexibility.

Embodiment 4

The preceding embodiments are implemented based on audio or video mode. In fact, the prompt information of a mobile terminal may be video, audio, animation, flash, vibration, and light twinkle. This embodiment links different prompts through a Profile file, and obtains the prompt information of the mobile terminal.

Figure 14:
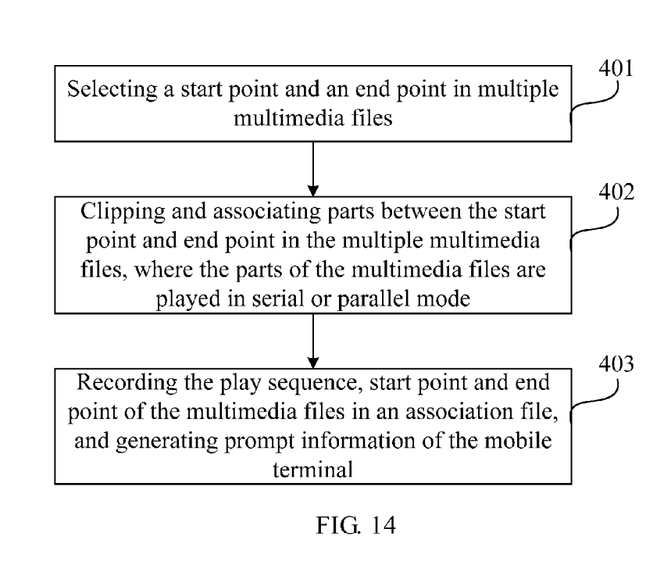
FIG. 14 is a flowchart of a method for generating prompt information of a mobile terminal according to an embodiment of the present invention.

FIG. 14 is a flowchart of a method for generating prompt information of a mobile terminal according to an embodiment of the present invention. The method includes the following steps:

Step 401: Selecting a start point and an end point in multiple multimedia files.

Step 402: Clipping and associating parts between the start point and end point in multiple multimedia files, where the clipped parts are played in serial or parallel mode, and generate an association file.

Step 403: Recording the play sequence, start point, and end point of the multimedia files in the association file, and generating prompt information of the mobile terminal.

The multimedia files may be audio files, video files, flash files, vibration information, and light twinkle information. This embodiment integrates audio prompts, vibration prompts and light twinkle prompts.

The preceding prompts are integrated into a piece of prompt information of a same logic in the form of a *.Ringtone file. Table 3 shows a *.Ringtone file, which is in serial mode. The serial mode means that all the ring tone elements are sorted by time sequence of a time axis, and are displayed to the user. The details are as follows:

TABLE 3

```
---Start---
AUDIO: MUSIC FILE A.mp3;
    RingTone/MUSIC FILE A.mp3;
    Start Time: 0'24";
    End Time: 1'24"
    Repeat Time: 1;
AUDIO: MUSIC FILE B.mp3;
    RingTone/MUSIC FILE B.mp3;
    Start Time: 1'24";
    End Time: 2'24";
    Repeat Time: 1;
Vibration: Stable vibration;
    System/Stable vibration;
    Start Time: 0'00"
    End Time: 0'30"
    Repeat Time: 1;
Light Twinkle:Interval Twinkle;
    System/Interval Twinkle;
    Start Time: 0'00";
    End Time: 0'30";
    Repeat Time: 1;
---END---
```

The preceding file organizes various ring tone elements in serial mode. After playing two music files, the ring tone player vibrates for 30 seconds, and then twinkles for 30 seconds.

Parallel mode. The parallel mode means that all the prompts are sorted by time sequence of a time line, and are displayed to the user. Different time lines may be parallel. It should be noted that prompts under different time lines may be generated in parallel mode, but prompts under a same time line can only be generated in serial mode. The details are shown in Table 4.

TABLE 4

```
---Start---
NoOfTimeLine:3;
TimeLine 1;
Start Time: 0'00';
End Time: 0'00";
Repeat Time: 0;
```

TABLE 4-continued

```
        AUDIO: MUSIC FILE A.mp3;
            RingTone/MUSIC FILE A.mp3;
            Start Time: 0'24";
            End Time: 1'24"
            Repeat Time: 1;
        AUDIO: MUSIC FILE B.mp3;
            RingTone/MUSIC FILE B.mp3;
            Start Time: 1'24";
            End Time: 2'24";
            Repeat Time: 1;
    TimeLine 2;
    Start Time: 0'30';
    End Time: 0'00";
    Repeat Time: 1;
    Vibration: Stable vibration;
        System/Stable vibration;
        Start Time: 0'00"
        End Time: 0'30"
        Repeat Time: 1;
    TimeLine 3;
    Start Time: 0'00';
    End Time: 0'00";
    Repeat Time: 0;
    Light Twinkle: Interval Twinkle;
        System/Interval Twinkle;
        Start Time: 0'00";
        End Time: 0'30";
        Repeat Time: 1;
    ---END---
```

The above file defines that prompts under all the time lines are generated according to the time of the time lines. Different prompts in time line 1 are generated in serial mode according to the time arrangement; that is, the audio prompt information is played continuously. In time line 2, the vibration begins 30 seconds after the audio is played, and continues on a cyclic basis. In time line 3, the light twinkle begins at zero seconds, and continues on a cyclic basis.

The method and apparatus for generating prompt information of a mobile terminal in embodiments of the present invention overcome the problem of single ring tone for prompt information of the mobile terminal in the prior art. In addition, the user may freely select any part of multimedia files used in the prompt information for encoding and playing, and control the play length. Furthermore, the prompt information may be an audio file, a video file, a flash file, vibration information or light twinkle information. Thus, the prompt information of a mobile terminal is generated in a simple and controllable manner.

Through the preceding description of embodiments of the present invention, it is understandable to those skilled in the art that embodiments of the present invention may be implemented by hardware or software in combination with a necessary hardware platform. Thus, the technical solution of the present invention may be made into software. The software may be stored in a non-volatile memory medium (for example, CD-ROM, U disk, and mobile hard disk), and include several commands that instruct a computer device (PC, server, or network device) to perform the methods provided in each embodiment of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for generating prompt information of a mobile terminal, comprising:
   selecting information of prompt elements including a start time and an end time of both a vibration media file and a light twinkle media file, separately;
   generating an association file specifying the information of prompt elements and locations of both the vibration media file and the light twinkle media file; and
   generating prompt information of the mobile terminal by implementing the vibration media file and the light twinkle media file according to the information of prompt elements and the locations in the association file.

2. The method according to claim 1, wherein the information of prompt elements further includes a vibration mode, and wherein the vibration mode is any one or combination of stable vibration, accelerating vibration and shift vibration.

3. The method according to claim 2, wherein the information of prompt elements further includes a light twinkle mode, and wherein the light twinkle mode is any one or combination of interval twinkle, accelerating twinkle and disorder twinkle.

4. The method according to claim 1, wherein the locations of both the vibration media file and the light twinkle media file are specified in the association file as relative locations.

5. The method according to claim 1, wherein the locations of both the vibration media file and the light twinkle media file are specified in the association file as absolute locations.

6. The method according to claim 1, wherein the association file further specifies names of both the vibration media file and the light twinkle media file.

7. The method according to claim 1, wherein the association file further specifies a number of replaying times.

8. The method according to claim 1, wherein the association file does not include a portion of the vibration media file and a portion of the light twinkle media file.

9. An apparatus for generating prompt information of a mobile terminal, comprising:
   a processor coupled to a non-transitory computer readable medium having computer executable instructions stored thereon that, when executed by the processor, cause the processor to:
     select information of prompt elements including a start time and an end time of both a vibration media file and a light twinkle media file, separately;
     generate an association file specifying the information of prompt elements and locations of both the vibration media file and the light twinkle media file; and
     generate prompt information of the mobile terminal by implementing the vibration media file and the light twinkle media file according to the information of prompt elements and the locations in the association file.

10. The apparatus according to claim 9, wherein the information of prompt elements further includes a vibration mode, and wherein the vibration mode is any one or combination of stable vibration, accelerating vibration and shift vibration.

11. The apparatus according to claim 10, wherein the information of prompt elements further includes a light twinkle mode, and wherein the light twinkle mode is any one or combination of interval twinkle, accelerating twinkle and disorder twinkle.

12. The apparatus according to claim 9, wherein the locations of both the vibration media file and the light twinkle media file are specified in the association file as relative locations.

13. The apparatus according to claim 9, wherein the locations of both the vibration media file and the light twinkle media file are specified in the association file as absolute locations.

14. The apparatus according to claim 9, wherein the association file further specifies names of both the vibration media file and the light twinkle media file.

15. The apparatus according to claim 9, wherein the association file further specifies a number of replaying times.

16. The apparatus according to claim 9, wherein the association file does not include a portion of the vibration media file and a portion of the light twinkle media file.

* * * * *